INVENTORS
GEORGE W. SPICER
HARRY C. KRAFFT, JR.
BY
ATTORNEYS

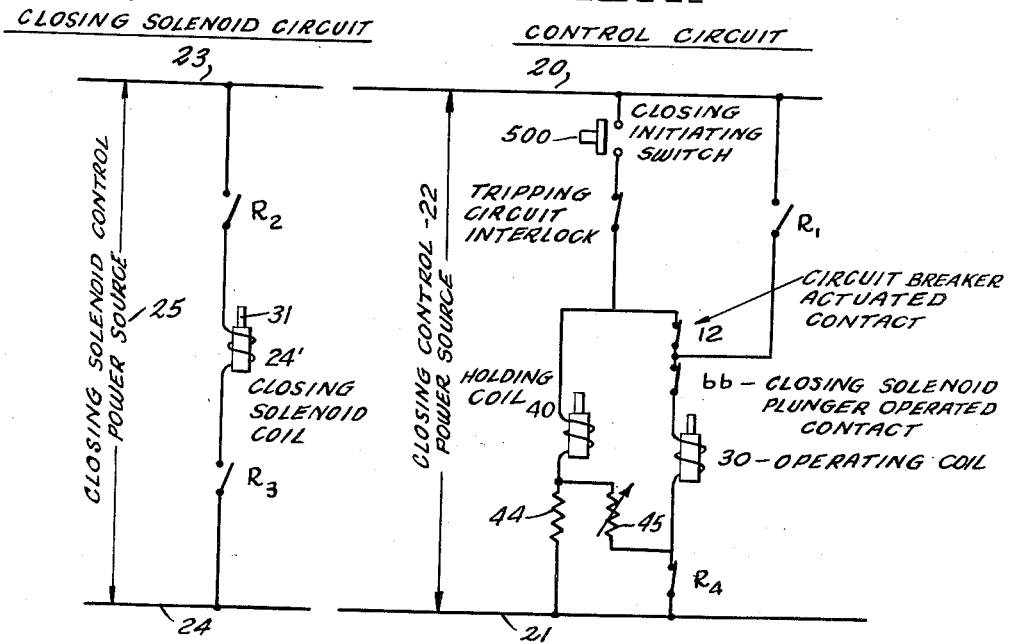
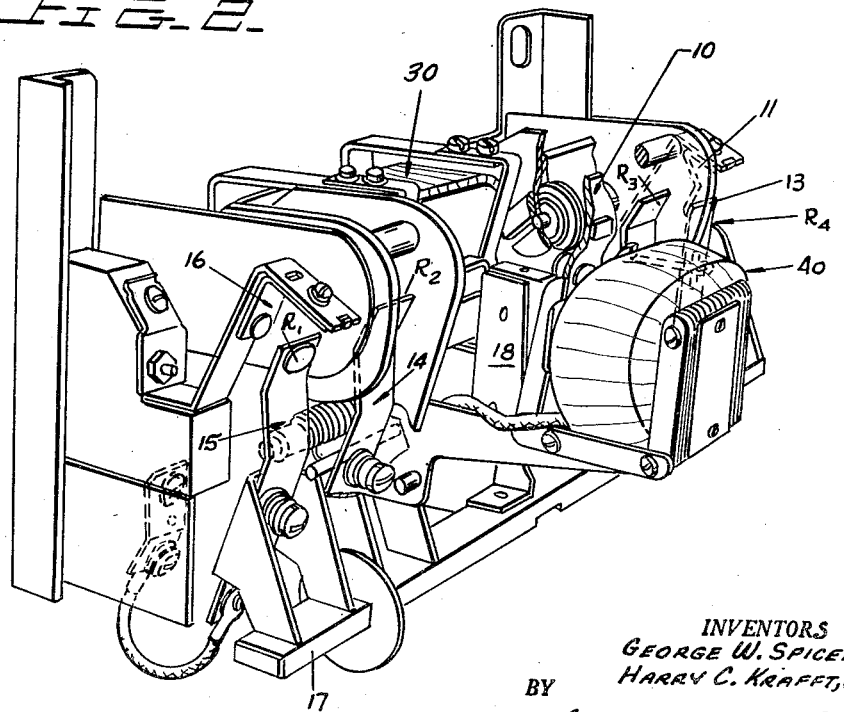

United States Patent Office 2,803,787
Patented Aug. 20, 1957

2,803,787

ELECTRIC CLOSING CIRCUIT FOR SOLENOID OPERATED CIRCUIT BREAKER

George W. Spicer and Harry C. Krafft, Jr., Philadelphia, Pa., assignors to I-T-E Circuit Breaker Company, Philadelphia, Pa., a corporation of Pennsylvania Application December 2, 1954, Serial No. 472,668

8 Claims. (Cl. 317—54)

Our invention relates to an electric closing circuit for solenoid operated circuit breakers.

In the operation of circuit breakers, it is frequencly desirable to provide an automatic closing means as well as manual closing means both of which are shown in copending applications Serial No. 253,717, filed October 29, 1951 now Patent No. 2,770,701, and Serial No. 254,349, filed November 1, 1951, assigned to the assignee of the instant application.

An electrically controlled closing mechanism for circuit breakers must have several features to insure safety and reliance of operation. Among these features is the assurance of complete closing operation once the closing switch has been operated, only a signle operation of the device for each operation of the closing switch, proper operation of the circuit even though the closing control power source has been removed and subsequently restored, and means to render the closing mechanism inoperative in the event an attempted closing operation is made when the circuit breaker is already in the closed position.

The electrically operated closing circuits and mechanisms of the prior art have achieved some of these desired results. However, in many instances, all of these features have not been obtained in the automatic closing mechanisms heretofore known.

In some installations wherein an auxiliary source of power is continuously available for the closing mechanism, the closing circuit has not been designed for operation following a temporary removal of the closing control power. However, if this type of circuitry is applied to an installation wherein a closing circuit is energized from the line being protected by the circuit breaker, difficulties must be encountered when the crcuit breaker is closed but not latched on a fault circuit since the initial engagement of the cooperating contacts will result in loss of power to the closing circuit and hence, when the circuit breaker opens, there may be an undesired second attempt to reclose the breaker.

The novel circuitry of our invention can be utilized in installations wherein an auxiliary source of power is available to energize the closing circuit and also in installations wherein the power for the closing circuit is derived from the circuit being protected by the circuit breaker.

Accordingly, the first object of our invention is to provide a closing control switch which will permit the circuit breaker mechanism to make one complete closing operation once the closing initiating switch has been closed and the first device in the control scheme has responded regardless of whether the control switch is released before the circuit breaker closing operation is completed.

The second object of our invention is to provide an electrical closing control circuit wherein the closing of the closing initiating switch when the switch circuit breaker is already in the closed position will not result in any operation of the closing mechanism.

The third object of our invention is the provision of a novel arrangement wherein only one closing operation of the mechanism occurs for each closing operation of the closing initiating switch even though the circuit breaker trips open during the closing operation or subsequently while the control circuit remains in the closing position.

The fourth object of our invention is to provide an electrical control circuit in which all of the control devices will reset to the original off position when the closing control power is removed from the closing control circuit.

The fifth object of our invention is to provide an electrical control scheme such that when the closing control power is restored following its removal, all of the control devices will return to the positions they held before the closing control power was removed.

These and other objects of the invention will be apparent from the following description when taken in connection with the drawings in which:

Figure 1A is a simplified presentation of Figure 1.

Figure 2 is a perspective view of the three position control relay used in the circuit of an invention. This figure illustrates the relay in the neutral position.

Figure 1:
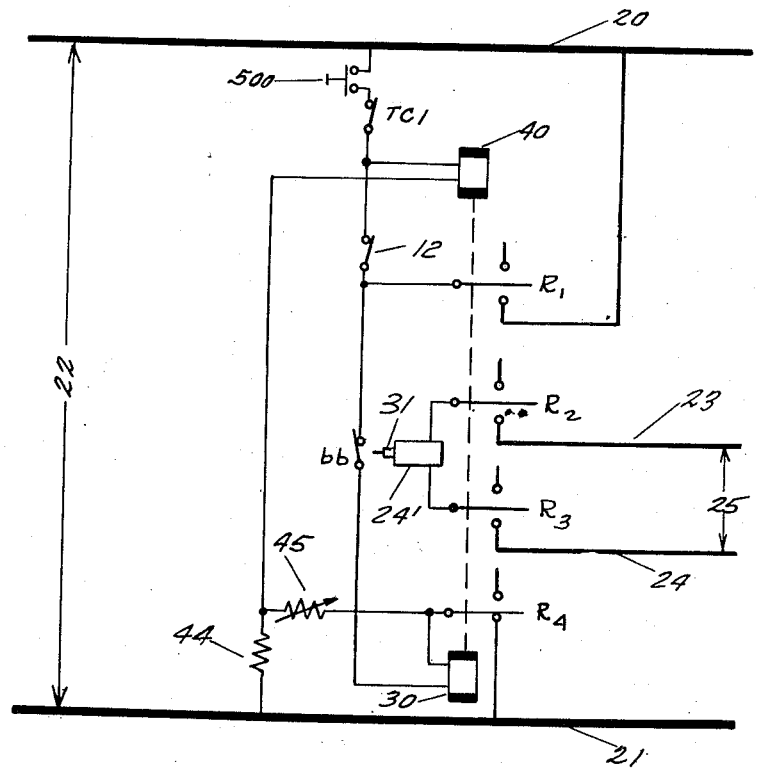
Figure 1 is a schematic wire diagram of our novel circuit breaker closing circuit, with the control relay in the neutral position.

As shown in copending application Serial No. 254,349, filed November 1, 1951, the basic components of an electrical closing control circuit are comprised of a control relay and a closing solenoid. The control relay is initially energized and then subsequently results in the energization of the closing solenoid.

In our instant invention, the control relay of Figure 2 is a three-position device having an operating coil 30, a holding coil 40 and four pairs of cooperating contacts R1, R2, R3 and R4. This type of relay is well-known in the art and is referred to as Type R-14-D as described in I-T-E Circuit Breaker Company publication 1B-5412.

The control relay is provided with a stationary blowout contact 10 for contact R3, stationary float contact 11 and movable float contact 13 for contacts R4, movable blowout coil contact 14 for contacts R2; movable and stationary contact 15 and 16 for contacts R1; and a contact bar 17 to tie contacts R1, R2, R3 and R4 together.

The operation of a control relay is as follows: When the control relay armature 18 is attracted by the operating coil 30, the contacts R1, R2, R3 and R4 are closed. When the armature is attracted by the holding coil 40, the contacts R1, R2, R3 and R4 are opened. When the armature assumes its neutral position (as shown) due to spring action when the operating coil 30 and the holding coil 40 are de-energized, the contacts R1, R2, and R3 will be opened and the contact R4 will be closed.

The closing solenoid coil 24' is in series with the contacts R2 and R3 of the control relay and since the full voltage and available current of the closing solenoid control power can be supplied to the closing solenoid coil 24', arc chutes may be provided for the control relay contacts R2 and R3.

The closing solenoid operated by the closing solenoid coil 24' may be constructed and functioned as described in copending application Serial No. 254,349, filed November 1, 1951.

The various components of the circuit are as follows.

The closing initiating switch 500, is manually operated by the operator to initiate the closing operation. The operating coil 30 of the control relay is connected in a first series circuit with the closing initiating switch 500. A circuit breaker actuating contact 12 is also connected in series with this circuit. The circuit breaker actuating contact 12 is open when the circuit breaker is closed and closed when the circuit breaker is open. Thus, the circuit breaker actuating contact 12 may be operated by an auxiliary switch of the type shown in copending application Serial No. 363,744 filed June 24, 1953, now Patent No. 2,761,041.

Contact bb is also positioned in the first series circuit and is actuated by the closing solenoid plunger 31. That is, the contact is normally closed except at the end of the solenoid closing stroke at which point, contact bb opens to result in de-energization of the control relay operating coil 30. Contact bb recloses as the solenoid plunger 31 begins to return to its unoperated or neutral position. The manner in which the contact bb is operated and controlled by the closing plunger 31 is well known in the art and is not illustrated in the accompanying figure.

The control relay holding coil 40 is connected in a second series circuit with the closing initiating switch 500. Fixed resistor 44 and variable resistor 45 connected in parallel with each other, are connected in series with the control relay holding coil 40. The ohmic value of the resistances 44 is such that it will limit the magnitude of current flow through the second series circuit so that the control relay holding coil 40 can be continuously energized when the second series circuit is connected across the closing control power source.

The variable resistor 45 connected in parallel with the fixed resistance 44 serves to temporarily reduce the resistance of the energizing circuit for the control relay holding coil 40 during the period of time that the contact R4 is closed. The variable resistor 45 can be adjusted to zero value for certain D.-C. applications and will have a given ohmic value in A.-C. application as determined by the magnetic flux density of the holding coil 40. With the contact R4 closed so that resistance 44—45 are in parallel, there will be a sufficient energizing current through the control relay holding coil 40 to permit the control relay armature to be attracted and thereby open contact R4.

When the contact R4 is opened, the resistance 45 will no longer be in parallel with resistance 44 and hence, this last mentioned resistance will be of sufficient magnitude so that the continuous current which may flow through the control relay holding 40 will be of a small enough magnitude so that the control relay holding coil 40 will not be damaged.

A trip circuit interlock contact TC1 is inserted in series with the closing initiating contact 500 and is thus positioned in both the first and second series circuit. The contact TC1, although forming no part of our instant invention, enables the various components of our circuitry to be returned to their normal position following the restoration of voltage under certain conditions.

The operation of the circuit is as follows. When the circuit breaker is open, the contacts 12 will be closed. With the closing initiating switch 500 open, both the operating coil 30 and the holding coil 40 of the control relay de-energized, the contact R4 will be in the closed position.

Hence, when the closing initiating contact 500 is closed by the operator, the control relay operating coil 30 will be energized from the closing solenoid control power source 22 through the line 20, the closing initiating contact 500, the closed contact 12, contact bb, contact R4 and the line 21. That is, the control relay operating coil 30 will be energized through the first series circuit. Also, the closing of the closing initiating switch 500 will result in the energization of the control relay holding coil 40 through the second series circuit.

Current will flow from the closing control power source 22 through the line 20, the closing initiating switch 500, contacts TC1, control relay holding coil 40, and through the parallel circuit consisting of the resistor 44 in one leg and the resistor 45 and contact R4 in the other leg and thence, back to the source to the line 21.

The magnetic effect of the control relay operating coil 30 under this condition is much greater than the magnetic effect of the control relay holding coil 40 and hence, the control relay armature will be attracted by the operating coil 30 thereby closing contacts R1, R2 and R3. As noted, the contact R4 was in a closed position and now will remain closed.

As best seen in Figure 1A, the contact R1 is connected in parallel with the closing initiating switch 500 and circuit breaker actuated contact 12. Hence, the closing of the contact R1 eliminates from the closing action any effect of the future position of the closing initiating contact 500, and circuit breaker actuated contact 12.

The energization of the operating coil 30, as noted, will close the contacts R2, R3 and hence, the third series circuit will be completed so that the closing solenoid coil 24' will be energized from the closing solenoid control power source 25 through the lines 23, 24, 20 and 21.

It will be noted that by providing the bypass contacts R1 for the closing initiating switch 500, the circuit breaker mechanism will make one complete closing operation once the closing initiating switch 500 has been closed and the control relay coils 30 and 40 have responded regardless of whether the closing initiating switch 500 is released before the circuit breaker closing operation is completed by the closing solenoid coil 24'.

Hence, the first object of our invention is achieved by means of this parallel lock-in circuit controlled by the contact R1.

As noted, the closing of the control relay contacts R2, R3 upon energization of the operating coil 30 results in the energization of the closing solenoid coil 24' thereby causing the closing solenoid plunger 31 to move the mechanism of the circuit breaker to the closed position.

At the end of the solenoid plunger 31 closing stroke, the contact bb will be opened thereby opening the first series circuit to result in the de-energization of the control relay operating coil 30. Prior to the complete closing of the circuit breaker, the contact 12 will remain closed and hence, the holding coil 40 will continue to be energized. Also, if the operator maintains the closing initiating switch 500 in the closed position, the control relay holding coil 40 will continue to be energized.

Since the operating coil 30 is de-energized, the magnetic effect of the control relay holding coil will thus control the armature of the control relay to cause it to open the contacts R1, R2, R3 and R4, as heretofore noted. Since R4 is open during this sequence of operations, the continuous current flowing through the closing initiating switch 500 and the holding coil 40 will be limited by the resistor 44 so that damage will not be done to the holding coil 40.

Assuming that the closing operation initiated by the switch 500 has been successful so that the circuit breaker operating mechanism remains in the closed position, no subsequent closing operation will occur since the contact 12 will now be opened by the circuit breaker thereby preventing continued or re-energization of the control relay operating coil 30.

Since the contact 12 is in the first series circuit, this prevention of the continued or re-energization of the operating coil 30 will be true regardless of the position or subsequent operation of the closing initiating switch 500.

Assuming that the operating mechanism of the circuit breaker has opened at some point during or subsequent to the closing operation but while the closing initiating switch 500 remains closed, no second operation of the closing mechanism will take place since the contact R4 is held open by the magnetic action on the control relay armature caused by the energized holding coil 40. Thus, both the second and third objects of our invention are achieved. That is, when the circuit breaker is in the closed position, a reclosing or continued closing of the closing initiating contact 500 will not result in any operation of the closing mechanism.

Also, only one closing operation of the mechanism will take place with each closing operation of the closing initiating contact 500 even though the circuit breaker trips during the closing operation or subsequently while the closing initiating contact 500 remains in the closed position.

In the event the closing control power source 22 is removed from the circuit at any time, the operating coil 30 and holding coil 40 will become or remain de-energized and the control relay armature will assume or remain in its neutral position with the contacts R1, R2 and R3 assuming or remaining in the open position and the contact R4 assuming or remaining in the closed position. This is referred to as the "off" position of the circuit. Thus, the fourth object of our invention is achieved. That is, the electrical control scheme is so arranged that when the closing control power source 22 is removed from the closing control circuit at any time, all of the control devices will reset to the original "off" position.

If the closing control power 22 is restored to the closing circuit subsequent to its removal, the closing control devices such as the contacts R1, R2, R3 and R4, operating coil 30 and the holding coil 40 of the control relay will assume the position and condition held at the time the power was removed thereby accomplishing the fifth object of our invention. That is, specifically, this is achieved as follows: If the circuit breaker mechanism was open at the time the closing control power 22 was initially removed and the closing initiating contact 500 was open, the restoration of the closing control power 22 will result in no change in any of the components since the operating coil 30 and the holding coil 40 will continue to be de-energized.

If the circuit breaker mechanism was closed when the closing control power source 22 was removed and the closing initiating switch was open, the restoration of the power source 22 will result in no change in the control relay position or condition since the operating coil 30 and the holding coil 40 will continue to be de-energized.

If the circuit breaker operating mechanism was closed, all closing functions having been completed, and the closing initiating switch 500 was colsed, restoration of the closing control power 22 will cause the control relay armature to again be attracted by the holding coil 40 which was the position held before the closing control power 22 was removed. This action occurs because the circuit breaker actuating contact 12 remains open thereby preventing energization of the operating coil 30. However, the holding coil 40 will be re-energized through the closing initiating switch 500 and the parallel circuit including the resistor 44 in one leg and the resistor 45 in contact R4.

That is, the contact R4 will be closed when the control relay assumes its "off" position at the time the closing control power 22 is removed. The resistance value of the resistor 45 is such that the circuit causes a sufficient current to flow through the holding coil 40 so that there will be sufficient magnetic force from the holding coil 40 to attract the control relay armature.

Near the end of the control relay armature movement, the contact R4 will open thereby removing from the circuit the parallel effect of the resistor 45 causing a reduction in the magnitude of current flowing through the holding coil 40. The reduced value of the current, caused by the resistance 44, will be of such a magnitude so that the holding coil 40 can be continuously energized without damage thereto. This is the condition of the closing circuit equipment before the removal of the closing control power 22 with the circuit breaker mechanism closed and the closing initiating switch 500 closed after all closing functions have been completed.

If the circuit breaker mechanism was closing at the time of the loss of closing control power 22, and the closing initiating switch 500 was closed, the loss of voltage will allow all the closing devices to return to the "off" position. Thus, upon restoration of the closing control power 22, the closing sequence will repeat and close the mechanism in response to the original initiation.

In the case of a closing circuit in which the closing initiating switch 500 is maintained in a closed position after the closing operation, subsequent tripping of the circuit breaker will place the control relay in such a position that removal of the closing control power 22 followed by restoration of the control power 22 will cause the operating coil 30 to be energized and the closing sequence would ordinarily be repeated. This undesirable operation must be prevented by circuits and means which will insure the opening of the initiating closing circuit when the circuit breaker with such a closing circuit is tripped. This circuitry and equipment comprise an operation of the tripping circuit and forms no part of our instant invention.

The tripping circuit interlock contact TCI represents such a tripping circuit device inserted in the first and second series circuit and in series with the closing initiating contact 500. Thus, from the above, it will be apparent that for all conditions of the circuit, the fifth object of our invention will be achieved.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. In an electrical closing circuit for a solenoid operated circuit breaker comprising a control relay and a closing solenoid; said control relay having an operating coil, a holding coil, and a first, second and third pair of normally open contacts and a fourth pair of normally closed contacts; said closing circuit also containing a fixed and a variable resistor, a circuit breaker actuated contact normally closed, a closing solenoid plunger operated contact normally closed, and a closing initiating switch; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said fixed resistor in a first branch and said variable resistor and said fourth contact in a second branch; said first and second series circuits being in electrical parallel and operatively connected to be energized; a third series circuit comprising a coil of said closing solenoid and said second and third contact, said third series circuit being operatively connected to be energized, said first contact, and said circuit breaker actuated contact forming a by-pass circuit for said closing initiating switch.

2. In an electrical closing circuit for a solenoid operated circuit breaker comprising a control relay and a closing solenoid; said control relay having an operating coil, a holding coil, and a first, second, third and fourth pair of contacts; said operating coil effective to close said first, second, third and fourth contact when said coil is energized; said holding coil effective to open said first, second, third and fourth contact when said holding coil is energized; said first, second and third contact opened and said fourth contact closed when said operating coil and said holding coil are de-energized; said closing circuit also containing a first and second resistor, a circuit breaker actuated contact normally closed, a closing solenoid plunger operated contact normally closed, and a closing initiating switch; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said first resistor in a first branch and said second resistor and said fourth contact in a second branch; said first and second series circuits being in electrical parallel and operatively connected to be energized; a third series circuit comprising a coil of said closing solenoid and said second and third contact, said third series circuit being operatively connected to be energized, said first contact, and said circuit breaker actuated contact forming a bypass circuit for said closing initiating switch.

3. In an electrical closing circuit for a solenoid operated circuit breaker comprising a control relay and a closing solenoid; said control relay having an operating coil, a holding coil, and a first, second, third and fourth pair of contacts; said operating coil effective to close said first, second, third and fourth contact when said coil is energized; said holding coil effective to open said first, second, third and fourth contact when said holding coil is energized; said first, second and third contact opened and said fourth contact closed when said operating coil and said holding coil are de-energized; said closing circuit also containing a first and second resistor, a circuit breaker actuated contact, a closing solenoid plunger operated contact normally closed, and a closing initiating switch; said circuit breaker actuated contact moved to the closed position when the circuit breaker is open and being moved to open position when the circuit breaker is in the closed position; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said first resistor in a first branch and said second resistor and said fourth contact in a second branch; said first and second series circuits being in electrical parallel across and operatively connected to be energized; a third series circuit comprising a coil of said closing solenoid and said second and third contact, said third series circuit being operatively connected to be energized, said first contact, and said circuit breaker actuated contact forming a bypass circuit for said closing initiating switch.

4. In an electrical closing circuit for a solenoid operated circuit breaker comprising a control relay and a closing solenoid; said control relay having an operating coil, a holding coil, and first, second, third and fourth pair of contacts; said operating coil effective to close said first, second, third and fourth contact when said coil is energized; said holding coil effective to open said first, second, third and fourth contact when said holding coil is energized; said first, second and third contact opened and said fourth contact closed when said operating coil and said holding coil are de-energized; said closing circuit also containing a first and second resistor, a circuit breaker actuated contact, a closing solenoid plunger operated contact, and a closing initiating switch; said circuit breaker actuated contact moved to the closed position when the circuit breaker is open and being moved to open position when the circuit breaker is in the closed position; said closing solenoid plunger operated contact being normally closed; said closing solenoid plunger operated contact opened only during the period of time that the closing solenoid plunger is at the end of its closing stroke; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said first resistor in a first branch and said second resistor and said fourth contact in a second branch; said first and second series circuits being in electrical parallel and operatively connected to be energized; a third series circuit comprising a coil of said closing solenoid and said second and third contact, said third series circuit being operatively connected to be energized, said first contact, and said circuit breaker actuated contact forming a bypass circuit for said closing initiating switch.

5. In an electrical closing circuit for a solenoid operated circuit breaker comprising a control relay and a closing solenoid; said control relay having an operating coil, a holding coil, and a first, second, third and fourth pair of contacts; said operating coil effective to close said first, second, third and fourth contact when said coil is energized; said holding coil effective to open said first, second, third and fourth contact when said holding coil is energized; said first, second and third contact opened and said fourth contact closed when said operating coil and said holding coil are de-energized; said closing circuit also containing a first and second resistor, a circuit breaker actuated contact, a closing solenoid plunger operated contact, and a closing initiating switch; said circuit breaker actuated contact moved to the closed position when the circuit breaker is open and being moved to open position when the circuit breaker is in the closed position; said closing solenoid plunger operated contact being normally closed; said closing solenoid plunger operated contact opened only during the period of time that the closing solenoid plunger is at the end of its closing storke; said first resistor being of sufficient magnitude to limit the current flow through said holding coil when said fourth contact is opened; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said first resistor in a first branch and said second resistor and said fourth contact in a second branch; said first and second series circuits being in electrical parallel and operatively connected to be energized; a third series circuit comprising a coil of said closing solenoid and said second and third contact, said third series circuit being operatively connected to be energized, said first contact, and said circuit breaker actuated contact forming a bypass circuit for said closing initiating switch.

6. In an electrical closing circuit for a solenoid operated circuit breaker comprising a control relay and a closing solenoid; said control relay having an operating coil, a holding coil, and a first, second, third and fourth pair of contacts; said operating coil effective to close said first, second, third and fourth contact when said coil is energized; said holding coil effetcive to open said first, second, third and fourth contact when said holding coil is energized; said first, second and third contact opened and said fourth contact closed when said operating coil and said holding coil are de-energized; said closing circuit also containing a first and second resistor, a circuit breaker actuated contact, a closing solenoid plunger operated contact, and a closing initiating switch; said circuit breaker actuated contact moved to the closed position when the circuit breaker is open and being moved to open position when the circuit breaker is in the closed position; said closing solenoid plunger operated contact being normally closed; said closing solenoid plunger operated contact opened only during the period of time that the closing solenoid plunger is at the end of its closing stroke; said first resistor being of sufficient magnitude to limit the current flow through said holding coil when said fourth contact is opened; said first contact and said closing solenoid plunger operated contact forming an alternate energizing circuit for said operating coil when said closing initiating switch is reopened prior to the completion of a closing operation; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said first resistor in a first branch and said second resistor and said fourth contact in a second branch; said first and second series circuits being in electrical parallel and operatively connected to be energized; a third series circuit comprising a coil of said closing solenoid and said second and third contact, said third series circuit being operatively connected to be energized, said first contact, and said circuit breaker actuated contact forming a bypass circuit for said closing initiating switch.

7. In an electrical closing circuit for a solenoid operated circuit breaker comprising a control relay and a closing solenoid; said control relay having an operating coil, a holding coil, and a first, second, third and fourth pair of contacts; said operating coil effective to close said first, second, third and fourth contact when said coil is energized; said holding coil effective to open said first, second, third and fourth contact when said holding coil is energized, said first, second and third contact opened and said fourth contact closed when said operating coil and said holding coil are de-energized; said closing circuit also containing a resistor, a circuit breaker actuated contact, a closng solenoid plunger operated contact, and a closing initiating switch; said circuit breaker actuated contact moved to the closed position when the circuit breaker is open and being moved to open position when the circuit breaker is in the closed position; said closing solenoid plunger operated contact being normally closed; said closing solenoid plunger operated contact opened only during the period of time that the closing solenoid plunger is at the end of its closing stroke; said resistor being of sufficient magnitude to limit the current flow through said holding coil when said fourth contact is opened; said first contact and said circuit breaker actuated contact forming an alternate energizing circuit for said holding coil when said closing initiating switch is reopened prior to the completion of a closing operation; said first contact and said closing solenoid plunger operated contact forming an atlernate energizing circuit for said operating coil when said closing initiating switch is reopened prior to the completion of a closing operation; a first series circuit comprising said closing initiating switch, said circuit breaker actuated contact, said closing solenoid plunger operating contact, said operating coil and said fourth contact; a second series circuit comprising said closing initiating switch, said holding coil, and a parallel circuit with said resistor in a first branch and said fourth contact in a second branch; said first and second series circuits being in electrical parallel and operatively connected to be energized; a third series circuit comprising a coil of said closing solenoid and said second and third contact, said third series circuit being operatively connected to be energized, said first contact and said circuit breaker actuated contact forming a bypass circuit for said closing initiating switch.

8. An electrical closing circuit for a solenoid operated circuit breaker comprising a closing control relay, a closing solenoid coil, a closing initiating switch, a circuit breaker actuated contact, a closing solenoid operated contact, and a resistor; said closing control relay having an operating coil, a holding coil, and a first, second, third and fourth contact; a first, a second, a first alternate and a second alternate energizing circuit; said first energizing circuit being comprised of said closing initiating switch, said circuit breaker actuated contact, said closing solenoid plunger operated contact, said operating coil and said fourth contact; said first alternate energizing circuit comprised of said first contact, said closing solenoid plunger operated contact, said operating coil and said fourth contact; said second energizing circuit being comprised of said closing initiating switch, said holding coil and a parallel path being comprised of a first leg containing said resistor and a second leg comprising said fourth contact; said second alternate energizing circuit being comprised of said first contact, said circuit breaker actuated contact, said holding coil and a parallel path comprising said resistor in a first path and said current connection and said fourth contact in a second path; said energizing circuits being in electrical parallel and operatively connected to be energized; a series circuit comprising said closing solenoid coil, said second contact and said third contact, said series circuit being operatively connected to be energized.

References Cited in the file of this patent

UNITED STATES PATENTS

| | | |
|---|---|---|
| 2,169,867 | Beeman | Aug. 15, 1939 |
| 2,475,338 | Rowe | July 5, 1949 |
| 2,550,125 | Schueler | Apr. 24, 1951 |